(12) United States Patent
Lindberg et al.

(10) Patent No.: US 11,913,679 B1
(45) Date of Patent: Feb. 27, 2024

(54) GEOTHERMAL SYSTEMS AND METHODS WITH AN UNDERGROUND MAGMA CHAMBER

(71) Applicant: EnhancedGEO Holdings, LLC, St. Petersburg, FL (US)

(72) Inventors: Greg Lindberg, Thonotosassa, FL (US); Kimberly C. Conner, Wetumpka, AL (US); Scott Hall, Chapel Hill, NC (US)

(73) Assignee: EnhancedGEO Holdings, LLC, St. Petersburg, FL (US)

( * ) Notice: Subject to any disclaimer, the term of this patent is extended or adjusted under 35 U.S.C. 154(b) by 0 days.

(21) Appl. No.: 18/116,693

(22) Filed: Mar. 2, 2023

(51) Int. Cl.
| | |
|---|---|
| F24T 50/00 | (2018.01) |
| F24T 10/13 | (2018.01) |
| F03G 4/00 | (2006.01) |
| F03G 4/02 | (2006.01) |
| F03G 4/06 | (2006.01) |
| F24T 10/20 | (2018.01) |

(52) U.S. Cl.
CPC ............... *F24T 50/00* (2018.05); *F03G 4/02* (2021.08); *F03G 4/023* (2021.08); *F03G 4/06* (2021.08); *F24T 10/13* (2018.05); *F24T 10/20* (2018.05)

(58) Field of Classification Search
CPC . F24T 50/00; F24T 10/13; F24T 10/20; F03G 4/02; F03G 4/023; F03G 4/06
USPC ............................................. 60/641.2, 641.4
See application file for complete search history.

(56) References Cited

U.S. PATENT DOCUMENTS

| | | | |
|---|---|---|---|
| 3,498,381 A | 3/1970 | Earlougher, Jr. | |
| 3,613,806 A | 10/1971 | Malott | |
| 3,757,516 A * | 9/1973 | McCabe | F24T 10/20 |
| | | | 165/45 |
| 3,765,477 A | 10/1973 | Van | |
| 3,864,208 A * | 2/1975 | Van Huisen | F24T 10/20 |
| | | | 376/324 |
| 3,950,949 A | 4/1976 | Martin et al. | |
| 3,957,108 A | 5/1976 | Huisen | |
| 3,967,675 A | 7/1976 | Georgii | |
| 4,043,129 A | 8/1977 | McCabe et al. | |
| 4,047,093 A | 9/1977 | Levoy | |

(Continued)

FOREIGN PATENT DOCUMENTS

| | | |
|---|---|---|
| AU | 2018308861 A1 | 1/2020 |
| AU | 2017268378 B2 | 9/2021 |

(Continued)

OTHER PUBLICATIONS

Boehm, R.F. et al, Modelling of a Magma Energy Geothermal Power Plant, presented at ASME Winter Annual Meeting, Boston MA, Dec. 1987, SAND-87-0564C, DE88 003793, 11 pages.

(Continued)

*Primary Examiner* — Hoang M Nguyen
(74) *Attorney, Agent, or Firm* — Stephen Y. Liu; James H. Ortega; Carstens, Allen & Gourley, LLP

(57) ABSTRACT

A geothermal system is used for obtaining heated heat transfer fluid, such as steam, via heat transfer with an underground reservoir of magma. The geothermal system includes a wellbore extending between a surface and into an underground chamber formed in a reservoir of magma. The chamber may be formed by injecting a fluid at an increased pressure into underground magma to form a cavity that acts as the underground chamber.

18 Claims, 9 Drawing Sheets

(56) References Cited

U.S. PATENT DOCUMENTS

| | | |
|---|---|---|
| 4,054,176 A | 10/1977 | Huisen |
| 4,057,108 A | 11/1977 | Broussard |
| 4,116,285 A | 9/1978 | Guerber |
| 4,140,184 A | 2/1979 | Bechtold et al. |
| 4,492,083 A | 1/1985 | McCabe et al. |
| 4,642,987 A | 2/1987 | Csorba et al. |
| 4,665,705 A | 5/1987 | Bonham, Jr. |
| 4,776,169 A | 10/1988 | Coles, Jr. |
| 4,929,348 A | 5/1990 | Rice |
| 5,513,573 A | 5/1996 | Sutton |
| 5,860,279 A | 1/1999 | Bronicki et al. |
| 5,911,684 A | 6/1999 | Shnell |
| 6,708,494 B1 | 3/2004 | Hamann |
| 7,124,584 B1 * | 10/2006 | Wetzel .................... F24T 10/20 |
| | | 60/641.2 |
| 8,047,285 B1 | 11/2011 | Smith |
| 8,201,409 B1 | 6/2012 | Zakiewicz |
| 8,524,787 B2 | 9/2013 | Ermolaev et al. |
| 9,006,298 B2 | 4/2015 | Leviness et al. |
| 9,108,858 B2 | 8/2015 | McDonald et al. |
| 9,150,423 B2 | 10/2015 | Hosono et al. |
| 9,182,149 B2 | 11/2015 | Gilaberte et al. |
| 9,298,756 B1 | 3/2016 | Johnson |
| 9,359,271 B2 | 6/2016 | Leviness et al. |
| 9,388,797 B2 | 7/2016 | Bronicki |
| 9,574,551 B2 | 2/2017 | Parrella et al. |
| 9,738,835 B2 | 8/2017 | Schrauwen |
| 9,765,605 B2 | 9/2017 | Williamson et al. |
| 10,017,395 B2 | 7/2018 | Kageyama et al. |
| 10,058,848 B2 | 8/2018 | Lipiec et al. |
| 10,131,545 B2 | 11/2018 | Sekine et al. |
| 10,173,202 B2 | 1/2019 | Hosono et al. |
| 10,203,162 B2 | 2/2019 | Yokomine et al. |
| 10,322,940 B2 | 6/2019 | Hosono et al. |
| 10,344,233 B2 | 7/2019 | Lucas et al. |
| 10,358,604 B2 | 7/2019 | Harris et al. |
| 10,710,049 B2 | 7/2020 | Mikhajlov et al. |
| 10,745,625 B2 | 8/2020 | Dogterom et al. |
| 10,759,668 B2 | 9/2020 | Hosono et al. |
| 10,792,645 B2 | 10/2020 | Hosono et al. |
| 10,974,969 B2 | 4/2021 | Hu et al. |
| 11,131,484 B2 | 9/2021 | McBay |
| 11,235,310 B2 | 2/2022 | Hosono et al. |
| 11,286,169 B2 | 3/2022 | Beach et al. |
| 11,325,105 B2 | 5/2022 | Beach et al. |
| 2004/0265158 A1 | 12/2004 | Boyapati et al. |
| 2006/0026961 A1 | 2/2006 | Bronicki |
| 2006/0180537 A1 | 8/2006 | Loftis et al. |
| 2006/0277917 A1 | 12/2006 | Hsu |
| 2008/0213157 A1 | 9/2008 | McGrady et al. |
| 2009/0226308 A1 | 9/2009 | Vandor |
| 2010/0025260 A1 | 2/2010 | Naterer et al. |
| 2010/0045042 A1 | 2/2010 | Hinders et al. |
| 2012/0144829 A1 | 6/2012 | Wiggs et al. |
| 2013/0101492 A1 | 4/2013 | McAlister |
| 2013/0232973 A1 | 9/2013 | McBay |
| 2013/0234444 A1 | 9/2013 | Rogers et al. |
| 2013/0333383 A1 | 12/2013 | Schwarck |
| 2014/0262137 A1 * | 9/2014 | McBay .................... F24T 10/30 |
| | | 165/45 |
| 2015/0128931 A1 | 5/2015 | Joshi et al. |
| 2015/0300327 A1 * | 10/2015 | Sweatman .............. E21B 43/25 |
| | | 60/641.2 |
| 2015/0368565 A1 | 12/2015 | Schrauwen |
| 2015/0377211 A1 | 12/2015 | Occhiello |
| 2016/0097376 A1 | 4/2016 | Wasyluk et al. |
| 2016/0115945 A1 | 4/2016 | Barsi et al. |
| 2016/0363350 A1 | 12/2016 | Tahara |
| 2017/0253492 A1 | 9/2017 | Beach et al. |
| 2018/0106138 A1 | 4/2018 | Randolph |
| 2018/0224164 A1 * | 8/2018 | Lakic ..................... F24S 90/00 |
| 2020/0040267 A1 | 2/2020 | Willigenburg et al. |
| 2020/0072199 A1 | 3/2020 | Fontana et al. |
| 2020/0231455 A1 | 7/2020 | Beach et al. |
| 2020/0325030 A1 | 10/2020 | Cussler et al. |
| 2020/0353518 A1 | 11/2020 | Chandran et al. |
| 2021/0114005 A1 | 4/2021 | Tao et al. |
| 2021/0122656 A1 | 4/2021 | Willberg et al. |
| 2023/0130169 A1 * | 4/2023 | Mcintyre .............. E21B 43/283 |
| | | 60/641.2 |

FOREIGN PATENT DOCUMENTS

| | | |
|---|---|---|
| AU | 2016398360 B2 | 1/2022 |
| CN | 105148824 A | 12/2015 |
| CN | 108952650 A | 12/2018 |
| CN | 112604697 A | 4/2021 |
| CN | 113494273 A | 10/2021 |
| CN | 113562692 A | 10/2021 |
| EP | 0236640 A1 | 9/1987 |
| EP | 0326736 A2 | 8/1989 |
| EP | 2792010 B1 | 1/2018 |
| EP | 3583321 A1 | 12/2019 |
| GB | 2592695 A | 9/2021 |
| GB | 2615913 A | 8/2023 |
| JP | H07286760 A | 10/1995 |
| JP | 2011052621 A | 3/2011 |
| JP | 2014202149 A | 10/2014 |
| JP | 2020067027 A | 4/2020 |
| WO | 2009116873 A1 | 9/2009 |
| WO | 2012079078 A2 | 6/2012 |
| WO | 2012037571 A3 | 7/2012 |
| WO | 2013025640 A2 | 2/2013 |
| WO | 2016204287 A1 | 12/2016 |
| WO | 2020150245 A1 | 7/2020 |
| WO | 2020160500 A1 | 8/2020 |
| WO | 2021257944 A9 | 4/2022 |
| WO | 2022123626 A1 | 6/2022 |
| WO | 2022211643 A1 | 10/2022 |

OTHER PUBLICATIONS

Colp, John L., Final Report—Magma Energy Research Project, Sandia Report, Sand82-2377, Unlimited Release, UC-66, prepared by Sandia National Laboratories under contrace DE-AC04-76DP00789, Printed Oct. 1982, 42 pages.

* cited by examiner

GEOTHERMAL SYSTEMS AND METHODS WITH AN UNDERGROUND MAGMA CHAMBER

TECHNICAL FIELD

The present disclosure relates generally to geothermal systems and related methods, and more particularly to geothermal systems and methods with an underground magma chamber.

BACKGROUND

Solar power and wind power are commonly available sources of renewable energy, but both can be unreliable and have relatively low power densities. In contrast, geothermal energy can potentially provide a higher power density and can operate in any weather condition or during any time of day. However, there exists a lack of tools for effectively harnessing geothermal energy.

SUMMARY

Most existing geothermal energy systems are used for heating applications, such as to heat a home or other space. Where geothermal has been attempted for energy production or other higher temperature applications, previous geothermal systems have required significant expenditure of finances, labor, and equipment, rendering them impractical for commercial development. Most previous geothermal systems tap into low temperature resources of less than 194° F. that are relatively near the surface, significantly limiting applications and locations where previous geothermal systems can be deployed. In addition to other disadvantages of previous geothermal technology, the inability of previous technology to efficiently and reliably access high-temperature underground geothermal resources renders conventional geothermal systems technologically and financially impractical.

As used herein, "magma" refers to extremely hot liquid and semi-liquid rock under the Earth's surface. Magma is formed from molten or semi-molten rock mixture found typically between 1 km to 10 km under the surface of the Earth.

As used herein, "borehole" refers to a hole that is drilled to aid in the exploration and recovery of natural resources, including oil, gas, water, or heat from below the surface of the Earth. As used herein, a "wellbore" refers to a borehole either alone or in combination with one or more other components disposed within or in connection with the borehole in order to perform exploration and/or recovery processes.

As used herein, "fluid conduit" refers to any structure, such as a pipe, tube, or the like, used to transport fluids. As used herein "drill stem" refers to a drill pipe consisting of tool joints, a swivel, a bit, a drill string, drill collars, drives, subs, a top drive, shock absorbers, reamers and/or any other related equipment used during the drilling process.

As used herein, "heat transfer fluid" refers to a fluid, e.g., a gas or liquid, that takes part in heat transfer by serving as an intermediary in cooling on one side of a process, transporting and storing thermal energy, and heating on another side of a process. Heat transfer fluids are used in processes requiring heating or cooling.

As used herein "superheated steam" refers to steam at a temperature higher than its vaporization point at the absolute pressure where the temperature is measured.

This disclosure recognizes the previously unidentified and unmet need for a geothermal system that harnesses a geothermal resource with a sufficiently high temperature that can aid in facilitating desired processes. For example, an underground geothermal reservoir, such as a magma reservoir, may facilitate the generation of high-temperature, high-pressure steam, while avoiding problems and limitations associated with previous geothermal technology. The geothermal systems of this disclosure generally include a wellbore that extends from a surface into an underground chamber formed in the underground thermal reservoir. The wellbore may have a variety of features and improvements that are described in more detail below. For example, the wellbore may include a specially formed underground chamber that facilitates improved heat transfer by allowing heat transfer fluid to be in direct or near direct thermal contact with magma in the thermal reservoir and allowing the heated heat transfer fluid to be returned to the surface with fewer thermal losses than are experienced with previous technology. As an example, a heat transfer fluid, such as water, can be heated (e.g., converted to steam) and returned to the surface for use in any appropriate high-temperature, high-pressure thermal process, such as energy production, a thermochemical reaction, or the like. In some cases, a molten salt heat transfer fluid is used that remains stable at high temperatures and can aid in forming and maintaining the underground chamber.

This disclosure also recognizes the previously unidentified and unmet need for a geothermal system that harnesses a geothermal resource with sufficiently high amounts of energy from magmatic activity such that the geothermal resource does not degrade significantly over time. This disclosure illustrates improved systems and methods for capturing energy from magma reservoirs, dykes, sills, and other magmatic formations that are significantly higher in temperature than heat sources that are accessed using previous geothermal technologies and that can contain an order of magnitude higher energy density than the geothermal fluids that power previous geothermal technologies. Unlike previous geothermal technologies, certain embodiments of the systems and methods described herein may be resistant to degradation, such that the operating lifetimes of the disclosed systems and methods may be significantly increased over those of previous technologies. In some cases, the present disclosure can significantly decrease energy production costs and/or reliance on non-renewable resources. In some cases, the present disclosure may facilitate the electrification of regions where access to reliable power is currently unavailable. The systems and methods of the present disclosure may also or alternatively aid in decreasing carbon emissions.

In some cases, an initial borehole is drilled from a surface until at least a depth is reached at which magma is exposed. A fluid conduit is then placed some distance into the exposed magma. A fluid is then supplied to the magma reservoir through the fluid conduit at an increased pressure to displace magma and create an underground chamber in the magma reservoir. The underground chamber is fluidically connected to the surface via the borehole. A geothermal system pumps heat transfer fluid into the underground chamber and uses the resulting heated heat transfer fluid to drive one or more thermal processes, such as for electricity generation, driving a chemical reaction, and/or providing heat or energy for another process. In some cases, a molten salt is used as the fluid to create the underground chamber in the magma reservoir and/or as the heat transfer fluid that is provided into the underground chamber to obtain heat for driving thermal processes. The use of a molten salt may facilitate operations at higher temperatures than can be achieved using conventional heat transfer fluids and improve overall stability and reliability of geothermal operations.

Certain embodiments may include none, some, or all of the above technical advantages. One or more technical advantages may be readily apparent to one skilled in the art from figures, description, and claims included herein.

BRIEF DESCRIPTION OF THE FIGURES

For a more complete understanding of the present disclosure, reference is now made to the following description, taken in conjunction with the accompanying drawings and detailed description, in which like reference numerals represent like parts.

FIG. 4A is a diagram of an initial borehole drilled to expose magma. FIG. 4B is a diagram illustrating the placement of a conduit in the exposed magma. FIG. 4C is a diagram illustrating the formation of an underground chamber in the magma. FIG. 4D is a diagram illustrating a geothermal system with the underground chamber of FUG. 4C.

DETAILED DESCRIPTION

Embodiments of the present disclosure and its advantages will become apparent from the following detailed description when considered in conjunction with the accompanying figures. In the figures, each identical, or substantially similar component that is illustrated in various figures is represented by a single numeral or notation. For purposes of clarity, not every component is labeled in every figure, nor is every component of each embodiment shown where illustration is not necessary to allow those of ordinary skill in the art to understand the disclosure.

The present disclosure includes unexpected observations, which include the following: (1) magma reservoirs can be located at relatively shallow depths of about 2.1-2.5 km; (2) the top layer of a magma reservoir may have relatively few crystals with little or no mush zone; (3) rock near or around magma reservoirs is generally not ductile and can support fractures; (4) a magma reservoir does not decline in thermal output over at least a two-year period; (5) eruptions at drill sites into magma reservoirs are unlikely (e.g., eruptions have not happened at African and Icelandic drill sites in over 10,000 years and it is believed a Kilauea, Hawaii drill site has never erupted); and (6) drilling into magma reservoirs can be reasonably safe.

Figure 1:
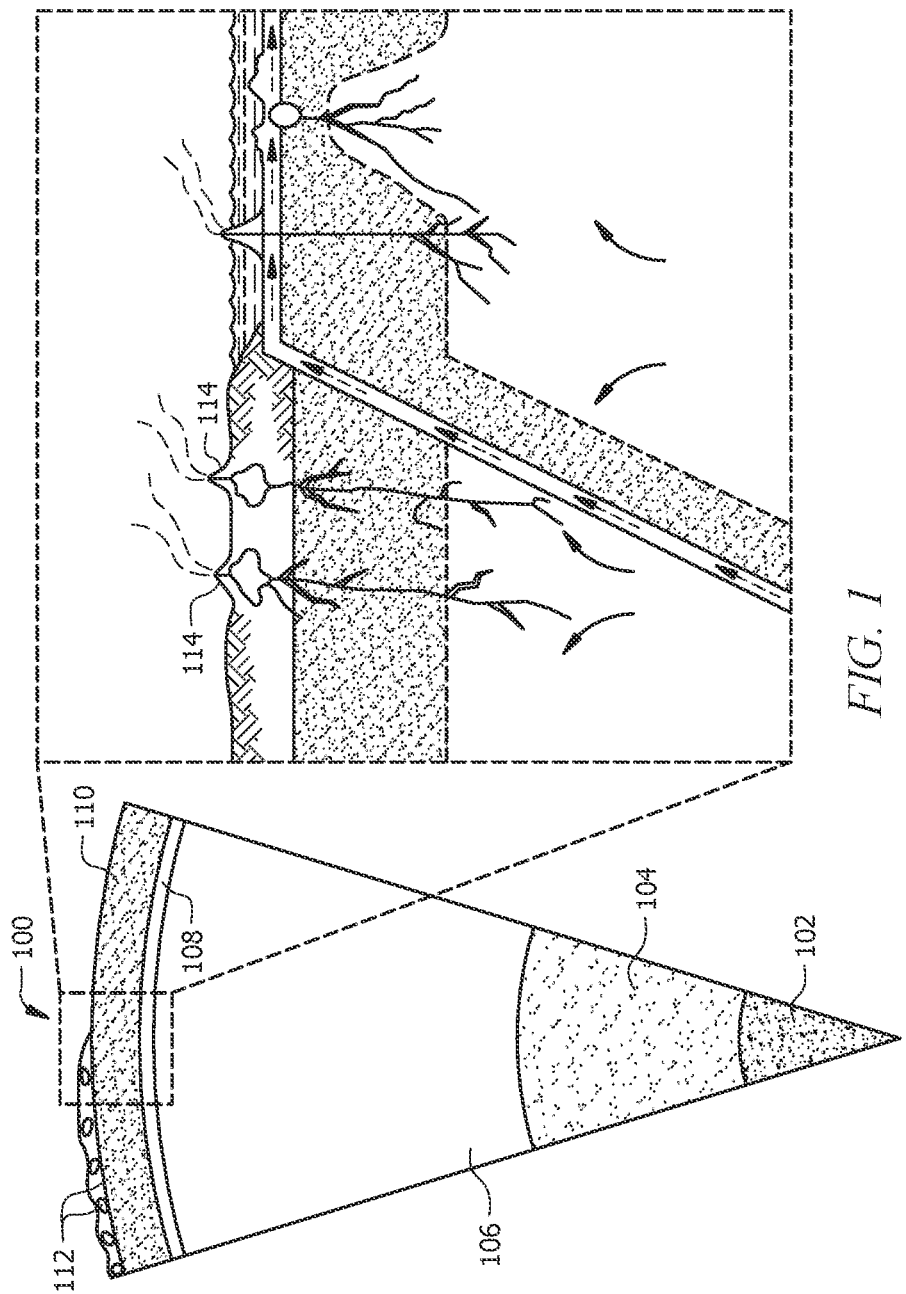
FIG. 1 is a diagram of underground regions in the Earth.

FIG. 1 is a partial cross-sectional diagram of the Earth depicting underground formations that can be tapped by geothermal systems of this disclosure (e.g., for generating geothermal power). The Earth is composed of an inner core 102, outer core 104, lower mantle 106, transition zone 108, upper mantle 110, and crust 112. There are places on the Earth where magma reaches the surface of the crust 112 forming volcanos 114. However, in most cases, magma approaches only within a few miles or less from the surface. This magma can heat ground water to temperatures sufficient for certain geothermal power production. However, for other applications, such as geothermal energy production, more direct heat transfer with the magma is desirable.

Figure 2:
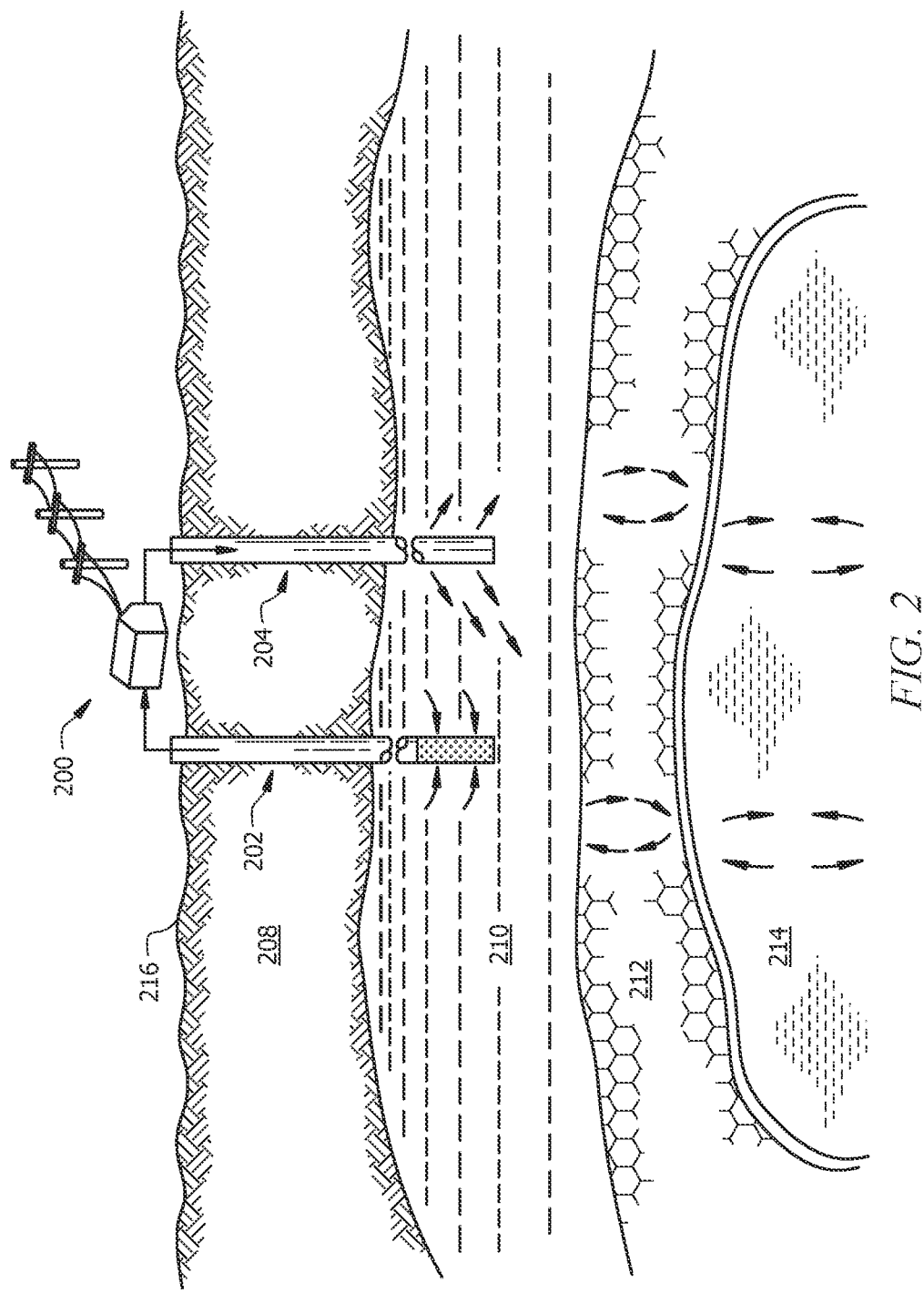
FIG. 2 is a diagram of a previous geothermal system.

FIG. 2 illustrates a conventional geothermal power generation system 200 that harnesses energy from heated ground water. The geothermal system 200 is a "flash-plant" that generates power from a high-temperature, high-pressure geothermal water extracted from a production well 202. The production well 202 is drilled through rock layer 208 and into the geothermal fluid layer 210 that serves as the source of geothermal water. The geothermal water is heated indirectly via heat transfer with intermediate layer 212, which is in turn heated by magma reservoir 214. Convective heat transfer (illustrated by the arrows indicating that hotter fluids rise to the upper portions of their respective layers before cooling and sinking, then rising again) may facilitate heat transfer between these layers. Geothermal water from layer 210 flows to the surface 216 and is used for geothermal power generation. The geothermal water (and possibly additional water or other fluids) is then injected back into layer 210 via injection well 204.

The configuration of conventional geothermal system 200 of FIG. 2 suffers from drawbacks and disadvantages, as recognized by this disclosure. For example, because geothermal water is a polyphase fluid (i.e., not pure water), the geothermal water flashes at various points along its path up to the surface 216, creating water hammer, which results in a large amount of noise and potential damage to system components. The geothermal water is also prone to cause scaling and corrosion of system components. Chemicals may be added to partially mitigate these issues, but this may result in considerable increases in operational costs and increased environmental impacts, since these chemicals are generally introduced into the environment via injection well 204.

Example Improved Geothermal System

Figure 3:
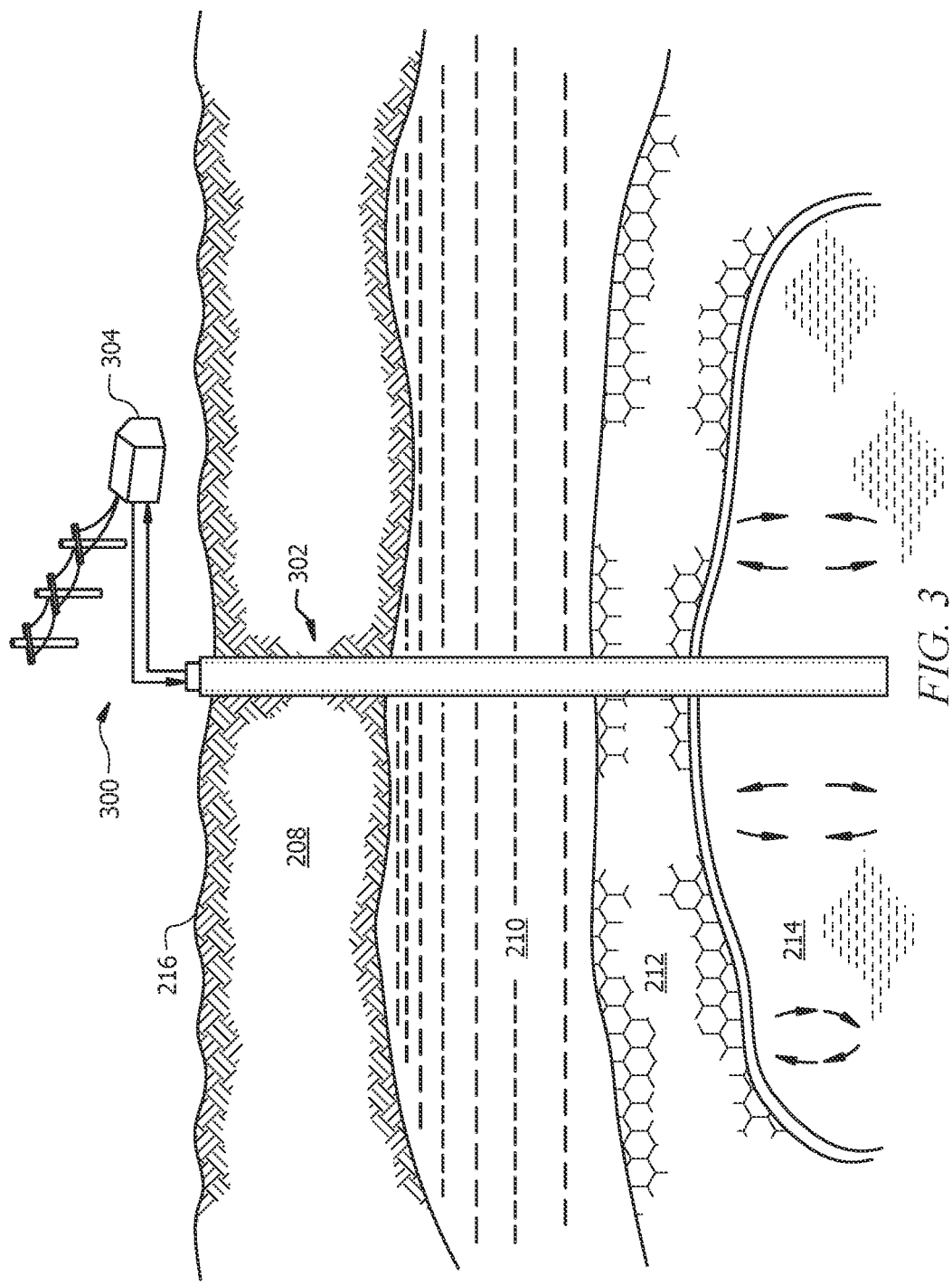
FIG. 3 is a diagram of an example improved geothermal system of this disclosure.

FIG. 3 illustrates an example magma-based geothermal system 300 of this disclosure. The geothermal system 300 includes a wellbore 302 that extends from the surface 216 at least partially into the magma reservoir 214. The geothermal system 300 is a closed system in which a heat transfer fluid is provided down the wellbore 302 to be heated and returned to a thermal or heat-driven process system 304 (e.g., for power generation and/or any other thermal processes of interest). As such, geothermal water is not extracted from the Earth, resulting in significantly reduced risks associated with the conventional geothermal system 200 of FIG. 2, as described further below. Heated heat transfer fluid is provided to the thermal or heat-driven process system 304. The heat-driven process system 304 is generally any system that uses the heat transfer fluid to drive a process of interest. For example, the heat-driven process system 304 may include an electricity generation system and/or support thermal processes requiring higher temperatures/pressures than could be reliably or efficiently obtained using previous geothermal technology, such as the system 200 of FIG. 2. Further details of components an example heat-driven process system 304 are provided with respect to FIGS. 4D and 7 below.

The geothermal system 300 provides technical advantages over previous geothermal systems, such as the conventional geothermal system 200 of FIG. 2. The geothermal system 300 can achieve higher temperatures and pressures for increased energy generation (and/or for more effectively driving other thermal processes). For example, because of the high energy density of magma in magma reservoir 214 (e.g., compared to that of geothermal water of layer 210), a single wellbore 302 can generally create the power of many wells of the conventional geothermal system 200 of FIG. 2. Furthermore, the geothermal system 300 has little or no risk of thermal shock-induced earthquakes, which might be attributed to the injection of cooler water into a hot geothermal zone, as is performed using the previous geothermal system 200 of FIG. 2. The heat transfer fluid in system 300 in FIG. 3 is generally not substantially released into the geothermal zone, resulting in a decreased environmental impact and decreased use of costly materials (e.g., chemical additives that are used and introduced to the environment in great quantities during some conventional geothermal operations). The geothermal system 300 may also have a simplified design and operation compared to those of previous systems. For instance, fewer components and reduced complexity may be needed at the heat-driven process system 304 because only clean heat transfer fluid (e.g., steam) reaches the surface 216. There is no need to separate out solids or other impurities that are common to geothermal water. The example geothermal system 300 may include further components not illustrated in FIG. 3. Further details and examples of different configurations of geothermal systems and methods of their preparation and operation are described below with respect to FIGS. 4A-4D.

Figure 4A:
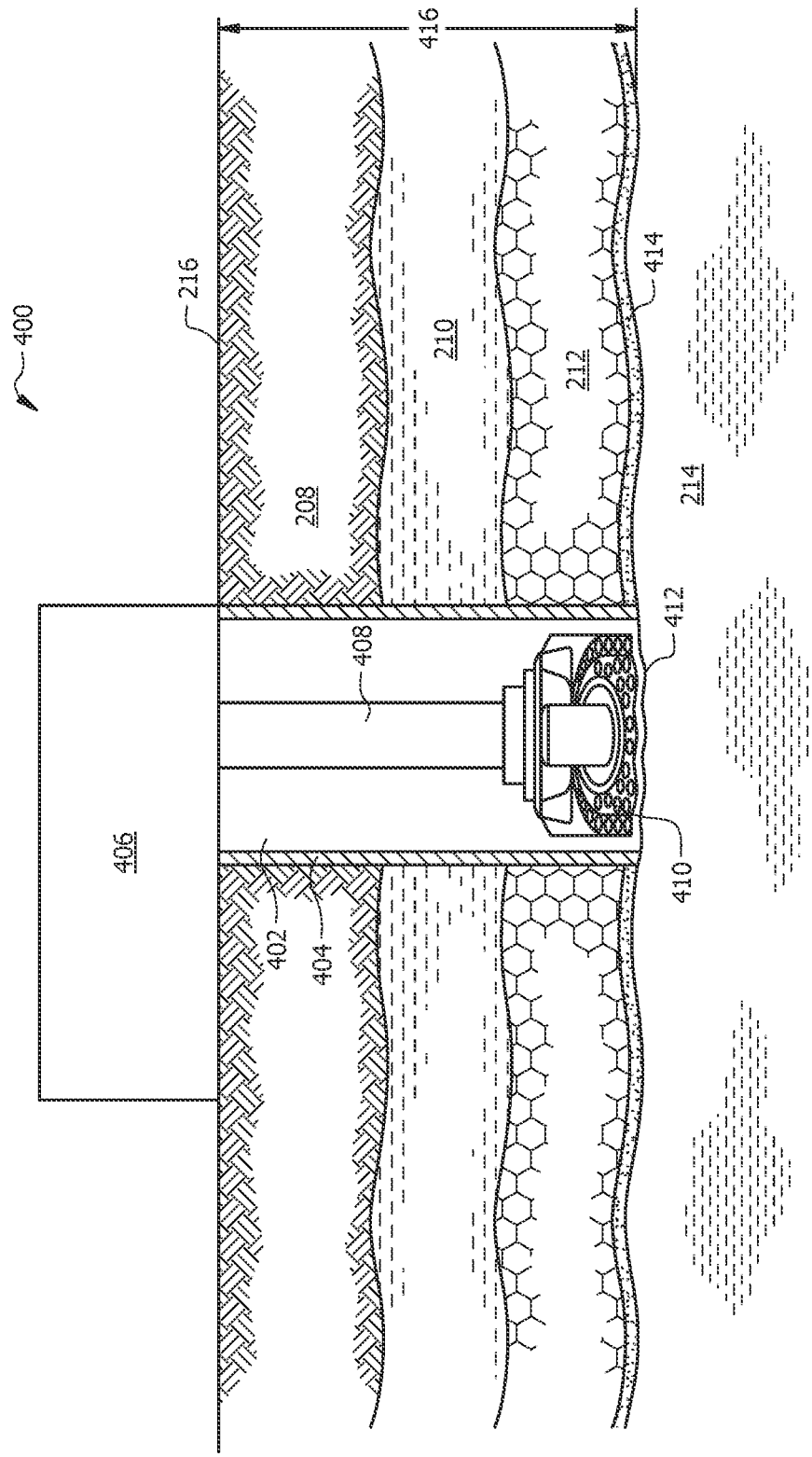
FIGS. 4A-4D are diagrams illustrating the preparation and operation of geothermal reservoirs for improved heat transfer with an underground thermal reservoir.
Figure 4B:
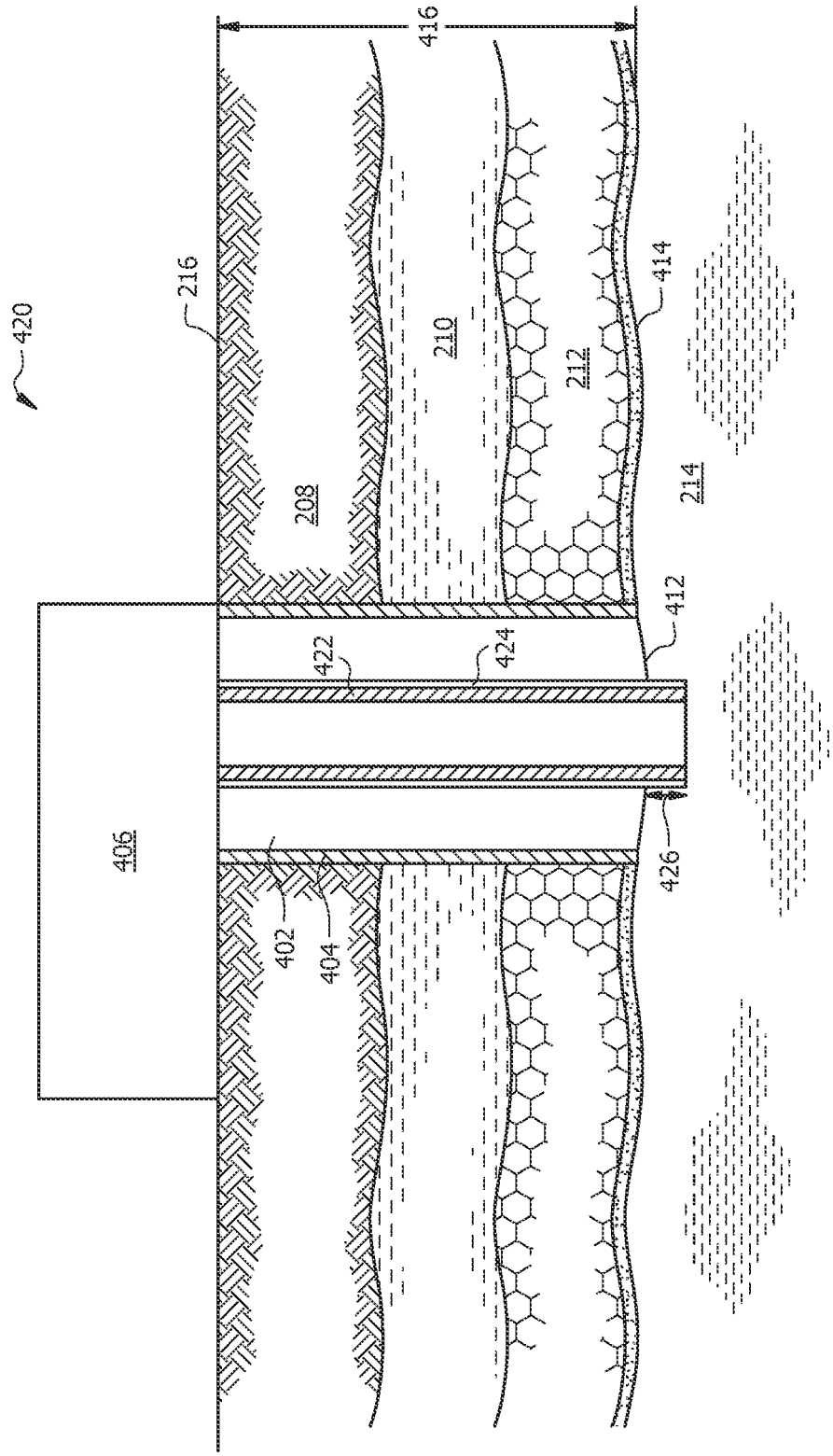
Figure 4C:
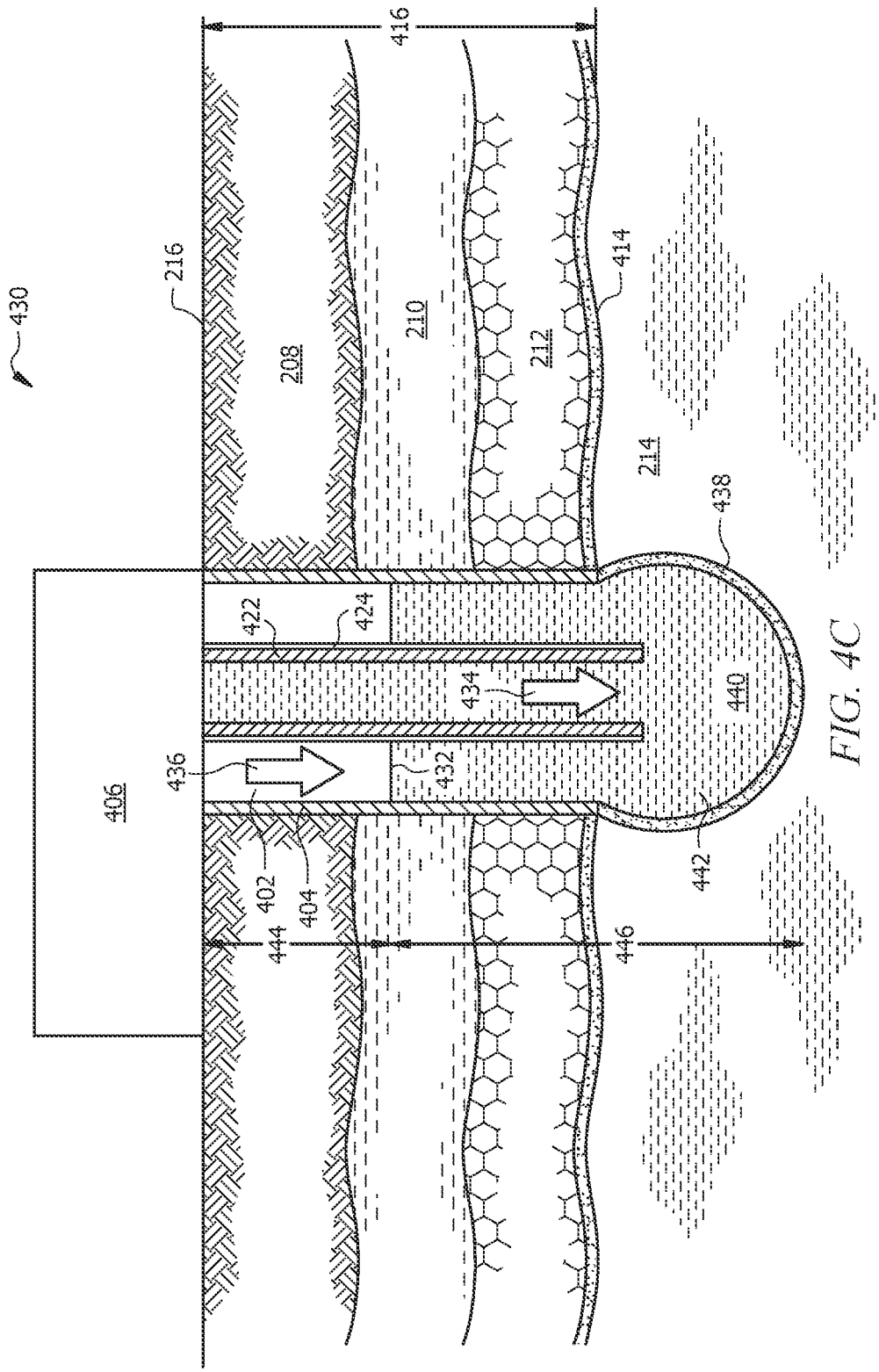
Figure 4D:
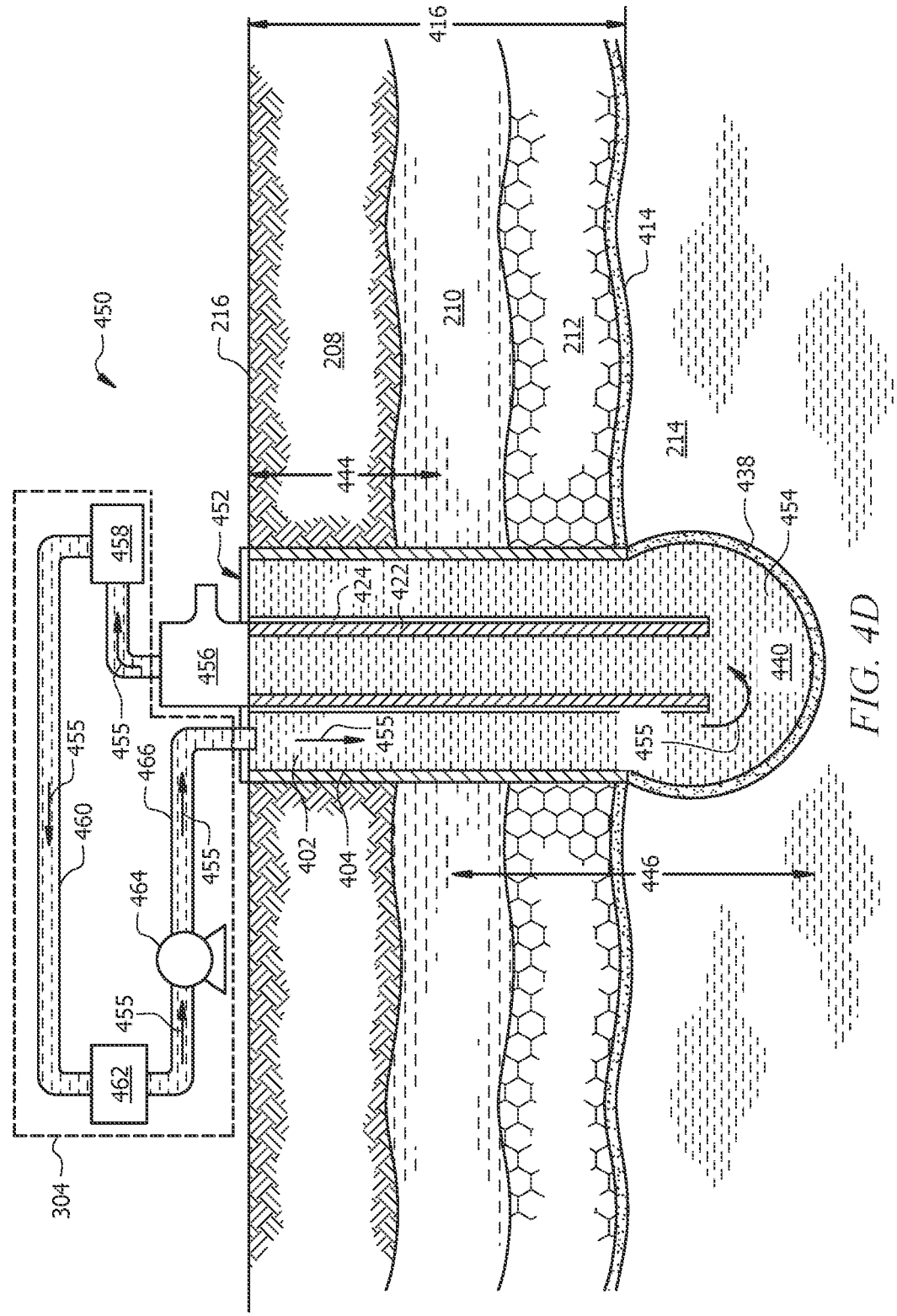

Example Geothermal System with Underground Chamber Having Direct Contact with Magma FIGS. 4A-4D illustrate the preparation and use of a geothermal system 450 (see FIG. 4D) configured to operate a thermal process system 304 using heat from a magma reservoir 214. FIGS. 4A, 4B, and 4C show example partially completed systems 400, 420, and 430, respectively, after different portions of the geothermal system 450 shown in FIG. 4D are completed. In the partially completed system 400 of FIG. 4A, a borehole 402 is drilled from the surface 216 using a drill bit 410, drill stem 408, and well-preparation system 406 to expose magma 412 in the magma reservoir 214. The borehole 402 may be drilled using drill bit 410 attached to drill stem 408. The borehole 402 generally extends through a ceiling 414 of the magma reservoir 214, such that magma 412 is exposed. In some cases, a portion of the solid ceiling 414 may still be present after drilling. In such cases, conduit 422 of FIG. 4B or another appropriate tool may be pushed through a relatively thin layer of rock in the ceiling 414 of the magma reservoir 214. The borehole 402 extends a distance 416 into the Earth. In practice, distance 416 is different depending on the location of the borehole 402 and the properties of the Earth at this location. As an example, in some cases the distance 416 may range from several hundred meters to several kilometers.

The drill bit 410 is used to drill downwards from the surface 216 to expose magma 412 in underground magma reservoir 214. The drill bit 410 can be attached to a drill stem 408 for drilling the borehole 402. The drill bit 410 can be any appropriate type of currently used or future-developed drill bit for forming the borehole 402. For example, the drill bit 410 may be a tri-cone drill bit with an integrated underreamer (not shown) that projects radially outward to aid in positioning the casing 404 (described further below) within the borehole 402. For example, an underreamer may be withdrawn or retracted to allow the drill bit 410 to be extracted from the borehole 402 without simultaneously extracting the well casing 404. One or more ejection nozzles (not shown for conciseness) may be positioned on the drill bit 410 and/or drill stem 408 to supply drilling fluid during drilling operations. For example, drilling fluid may be supplied at an increased pressure to facilitate extraction of well cuttings and other material from within the borehole 402. The drill bit 410 and drill stem 408 are operated using the well-preparation system 406 described further below.

A casing 404 may be conveyed into the borehole 402 while or after the drill bit 410 is advanced into the borehole 402 towards the magma reservoir 214. The casing 404 may be disposed within the borehole 402. The casing 404 provides an internal surface within the borehole 402. In the example of FIG. 4A, the casing 404 extends along at least a portion of the internal surface of the borehole 402. For example, the casing 404 may extend from the surface 216 until the ceiling 414 of the magma reservoir 214. The casing 404 may be any appropriate material for providing structural support to the borehole 402 and preventing or limiting transport of fluid from the borehole 402 to the adjacent layers 208, 210, 212 of the Earth. For example, the casing 404 may be an alloy attached to the wall of the borehole 402. The casing 404 may be attached with a cement or other appropriate material. The casing 404 may have a relatively high thermal conductivity to improve heat transfer between heat transfer fluid 454 supplied to the borehole 402 and high temperatures found underground (see FIG. 4D). Examples of hanging the casing 404 in the borehole 402 are described further below and with respect to FIG. 5. Other examples of preparing a borehole 402 and hanging a casing are described in U.S. patent application Ser. No. 18/099,499, filed Jan. 20, 2023, and titled "Geothermal Power from Superhot Geothermal Fluid and Magma Reservoirs"; U.S. patent application Ser. No. 18/099,509, filed Jan. 20, 2023, and titled "Geothermal Power from Superhot Geothermal Fluid and Magma Reservoirs"; U.S. patent application Ser. No. 18/099,514, filed Jan. 20, 2023, and titled "Geothermal Power from Superhot Geothermal Fluid and Magma Reservoirs"; U.S. patent application Ser. No. 18/099,518, filed Jan. 20, 2023, and titled "Geothermal Power from Superhot Geothermal Fluid and Magma Reservoirs"; and U.S. patent application Ser. No. 18/105,674, filed Feb. 3, 2023, and titled "Wellbore for Extracting Heat from Magma Chambers", the entirety of each of which are hereby incorporated by reference.

The well-preparation system 406 includes components and other equipment used to achieve the configurations illustrated in FIGS. 4A-4D. The well-preparation system 406 may be a drilling rig with optional modifications where necessary to achieve the functions described in this disclosure. For example, the well-preparation system 406 may include a derrick along with the machinery, control systems, and other equipment for operating the drill bit 410 to form the borehole 402. For example, the well-preparation system 406 may include a motor that rotates the drill bit, an interface for connecting to the drill stem 408, equipment for extending the drill stem 408 into the borehole 402, and fluid handling components, such as a pump and fluid conduit, for providing drilling fluid into the borehole 402. The well-preparation system 406 also includes equipment to aid in hanging the casing 404, placing a fluid conduit 422 (see FIG. 4B) into the magma 412, and controllably pressurizing the fluid conduit 422 to form an underground chamber 440 (see FIG. 4C). All or a portion of well-preparation system 406 may be replaced with the thermal process system 304 once the completed wellbore 452 of FIG. 4D is established, or all or a portion of the thermal process system 304 may be part of the well-preparation system 406.

Turning now to FIG. 4B, another partially completed system 420 is shown in which a fluid conduit 422 has been extended into the underground magma reservoir 214. The fluid conduit 422 is generally a tube or pipe with a high mechanical strength and a resistance to high temperatures and pressures. The fluid conduit 422 has a hollow center for conveying heat transfer fluid from the borehole 402 to the surface 216 during operation (see FIG. 4D). The fluid conduit 422 may be made of an alloy material that will not melt at the high temperatures of the magma 412 and that can tolerate the high pressures (e.g., pressure 434 of FIG. 4C) experienced during preparation and operation of the geothermal system 450 of FIG. 4D. In some cases, the fluid conduit 422 is a drill stem (e.g., or an outer body of a drill stem) used to form the borehole 402. For example, the drill bit 410 used to drill the borehole 402 may be removed from the drill stem 408, such that the drill stem 408 can act as the fluid conduit 422.

The fluid conduit 422 is extended a distance 426 below the surface of magma 412. The well-preparation system 406 includes components that facilitate the lowering of the fluid conduit 422 into the magma 412. For example, the well-preparation system 406 may have a traveling block or similar that can be used to lower the fluid conduit 422 into the borehole 402. In some cases, the fluid conduit 422 may be lowered in sections that are connected (e.g., welded or otherwise fastened together) to form a conduit of sufficient length to extend into the magma 412 and strength to withstand pressure 434 of FIG. 4C. The fluid conduit 422 may have an insulation layer 424, as described in greater detail below with respect to FIG. 4D. As an example, the insulation layer 424 may include a cement or other material with a relatively low thermal conductivity.

Turning now to FIG. 4C, a partially completed system 430 is shown in which an underground chamber 440 has been formed in the magma reservoir 214. The underground chamber 440 is a cavity formed in the magma reservoir 214. The underground chamber 440 may be formed by injecting a pressurization fluid 442 into the magma reservoir 214 through fluid conduit 422. The injected pressurization fluid 442 displaces magma 412 in the magma reservoir 214 to form the underground chamber 440. The pressurization fluid 442 is any fluid with appropriate properties of density, viscosity, and heat capacity for providing a sufficient pressure 434 to form the underground chamber 440, as described in more detail below. In some cases, the pressurization fluid 442 is a molten salt. In some cases, the pressurization fluid 442 is water. To provide further non-limiting examples, the pressurization fluid 442 may include a brine solution, one or more refrigerants, a thermal oil (e.g., a natural or synthetic oil), a silicon-based fluid, a molten metal, or a nanofluid (e.g., a carrier fluid containing nanoparticles). Details and examples of certain of these fluids are described further below with respect to the heat transfer fluid 454 of FIG. 4D.

As described above, the pressurization fluid 442 is provided at a sufficient pressure 434 to displace the magma 412 to form the cavity corresponding to the underground chamber 440. In order to achieve pressure 434, a lower portion 446 of the borehole 402 may be separated from an upper portion 444 of the borehole 402 using a separation device 432. The separation device 432 may be a packer with a surface that extends from the fluid conduit 422, or the insulation layer 424 if the fluid conduit 422 is insulated, to the wall (e.g., casing 404) of the borehole 402. The separation device 432 physically separates the upper portion 444 from the lower portion 446. In some cases, a second pressure 436 may be applied above the separation device 432, while the pressurization fluid 442 is supplied at pressure 434. The second pressure 436 may be applied such that the pressure difference between pressure 434 and second pressure 436 is less than a threshold value (e.g., determined by operating parameters of the separation device 432). For example, the pressure difference may be maintained at a value that prevents damage to the separation device 432 and/or other components of the system 430. After the underground chamber 440 is formed, a flow of pressurization fluid 442 (or heat transfer fluid 454) may continue to be supplied into the underground chamber 440 to help maintain the chamber's structure.

While or after the underground chamber 440 is formed, a surface 438 may be allowed to form at least temporarily around the underground chamber 440. The surface 438 may be hardened magma (e.g., rock with or without glassy material) that forms via heat transfer between the magma 412 and the pressurization fluid 442. In some cases, all of the surface 438 is a solid material. In other cases, all or a portion of the surface 438 may include magma 412, such that there is direct contact between fluid in the chamber 440 (whether the pressurization fluid 442 of FIG. 4C or the heat transfer fluid 454 of FIG. 4D). In some cases, the pressurization fluid 442 is supplied at a sufficiently cool temperature to maintain a solid surface 438. During subsequent use of the underground chamber 440 (see FIGS. 4D and 6), all or a portion of the surface 438 may be allowed to be heated and melt to increase thermal contact between fluid in the underground chamber 440 and the magma 412.

Figure 7:
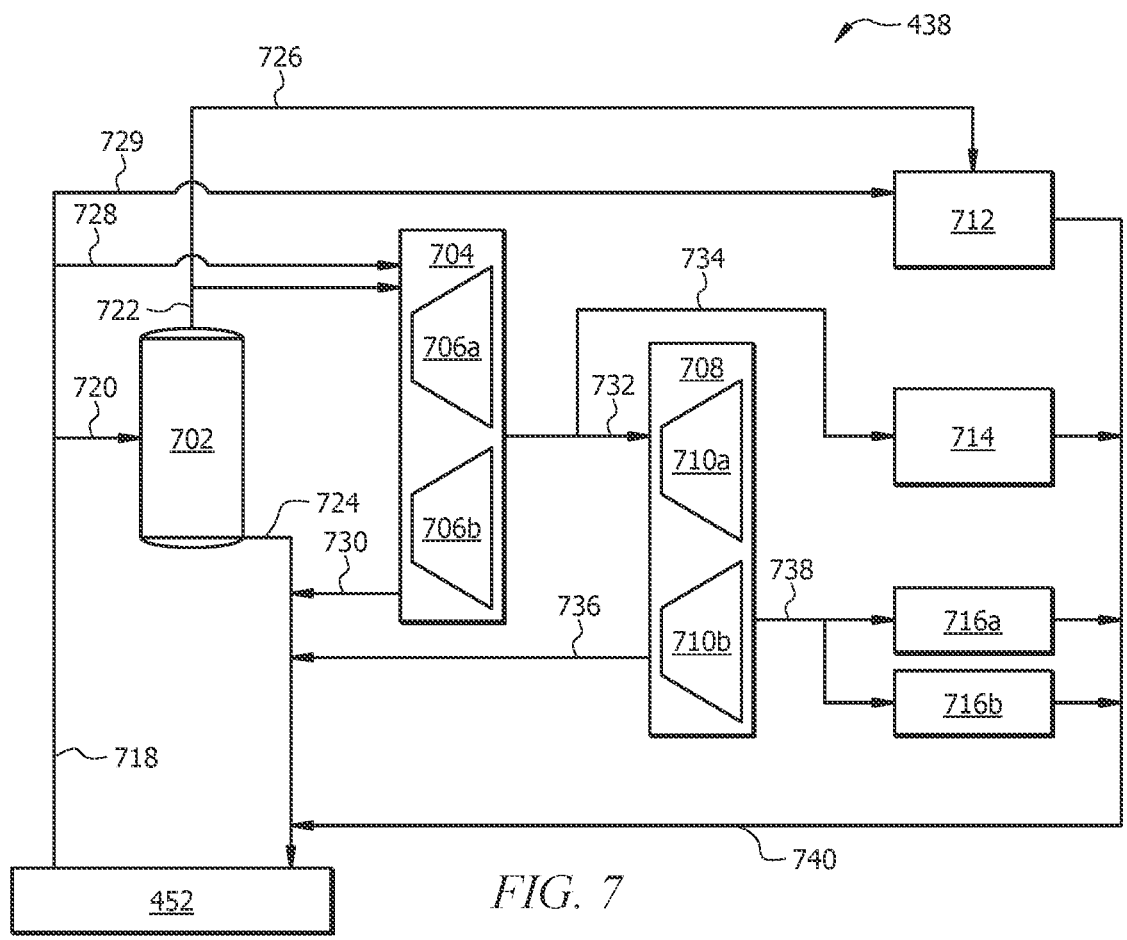
FIG. 7 is a diagram of an example system for performing thermal or heat-driven processes.

FIG. 4D shows a completed geothermal system 450 in which the wellbore preparation system 406 is replaced by a wellhead 456 and a thermal process system 304 (see FIGS. 3 and 7 and corresponding descriptions). The geothermal system 450 facilitates the heating of a heat transfer fluid 454 via heat transfer with the underground magma reservoir 214. The geothermal system 450 includes a wellbore 452 that includes the borehole 402, casing 404, and fluid conduit 422, and underground chamber 440, described above with respect to FIGS. 4A-4C, as well as a wellhead 456 and thermal process system 304. As described above, the borehole 402 extends from the surface 216 and into the underground chamber 440, which is a cavity formed in the magma reservoir 214. The wellhead 456 and thermal process system 304 include at least a fluid pump 464 that can drive a flow of heat transfer fluid 454 into the underground chamber 440 and back to the surface 216 via fluid conduit 422 in a closed loop flow path illustrated generally by arrows 455 in FIG. 4D. Heat transfer fluid 454 may be the same as or different than the pressurization fluid 442 described above with respect to FIG. 4C. For example, the heat transfer fluid 454 may include water, a brine solution, one or more refrigerants, one or more thermal oils, one or more molten salts, one or more ionic liquids, and/or a nanofluid.

The geothermal system 450 forms a closed loop for the flow of heat transfer fluid 454 into the wellbore 452, out of the wellbore 452, to the heat-driven process system 304 (see also FIG. 7), and back to the wellbore 452, as illustrated by arrows 455. For example, the fluid pump 464 may provide a flow of heat transfer fluid 454 toward the underground chamber 440. The fluid pump 464 is any appropriate fluid pump for driving a flow of the heat transfer fluid 454. The fluid pump 464 may pump heat transfer fluid 454 stored in a fluid source 462 (e.g., a tank or other canister of the heat transfer fluid 454). The heat transfer fluid 454 may be provided in the liquid phase. In the example of FIG. 4D, an inlet fluid conduit 466 facilitates flow of heat transfer fluid 454 into the wellbore 452. The inlet fluid conduit 466 may be connected through or separate from the wellhead 456. Fluid pump 464 may provide heat transfer fluid 454 at a flow rate to achieve a target temperature via heat transfer with the magma reservoir 214 (e.g., to achieve a target residence time in the underground chamber 440, to achieve a target temperature and/or pressure of the heat transfer fluid 454 received at the surface 216, etc.). During operation of the geothermal system 450, the fluid pump 464 may provide a flow of the heat transfer fluid 454 at a pressure, flow rate, or both that maintains the cavity of the underground chamber 440 that is formed in in the magma reservoir 214, such that the underground chamber 440 is not filled with magma 412.

The fluid conduit 422 extends from the surface 216 toward or into the underground chamber 440. To operate the geothermal system 450, the fluid conduit 422 may be attached to the wellhead 456 (described further below) or using any other appropriate conduit connecters at the surface 216. The fluid conduit 422 generally facilitates flow of heated heat transfer fluid 454 between the underground chamber 440 and the surface 216, e.g., from within the wellbore 452 back to the surface 216. The fluid conduit 422 may have an insulation layer 424 that aids in maintaining the heated heat transfer fluid 454 at an elevated temperature while it is transported back to the surface 216. For example, the insulation layer 424 may include a cement or other material with a relatively low thermal conductivity. During operation of the geothermal system 450, the insulation layer 424 may help maintain the heat transfer fluid 454 at an increased temperature by limiting heat transfer with the cooler heat transfer fluid 454 entering from the top of the wellbore 452.

The heated heat transfer fluid 454 may be provided to the thermal process system 304. In the example of FIG. 4D, the thermal process system 304 includes a thermal processing subsystem 458, a return conduit 460, a heat transfer fluid source 462, a fluid pump 464, and an inlet conduit 466. The thermal processing subsystem 458 is generally a system in which heated heat transfer fluid 454 is used to perform some process, such as for electricity generation, chemical production, or another industrial process. Further details and examples of a thermal processing subsystem 458 are provided below with respect to FIG. 7. The return conduit 460 facilitates the transport of heat transfer fluid 454 that is cooled by the thermal processing subsystem 458 back to the wellbore 452. For example, the return conduit 460 may allow flow of heat transfer fluid 454 back to the fluid source 462 (e.g., a fluid storage tank or the like), so that it can be pumped back into the wellbore 452 using fluid pump 464. The fluid pump 464 is any appropriate pump capable of pumping the heat transfer fluid 454. Fluid conduit 460, 466 (and any other conduit whether labeled or not labeled in FIG. 4D) may be any appropriate pipes and/or tubes for the flow of heat transfer fluid 454 between the interconnected components of the geothermal system 450.

An example thermal processing subsystem 458 and its operation is described in greater detail below with respect to FIG. 7. However, as a brief example, the heated heat transfer fluid 454 may be steam or superheated steam that is used to drive one or more turbines of the thermal processing subsystem 458 for electricity generation. Superheated steam is steam heated above its vaporization pressure at the current pressure. In some cases, the heat transfer fluid 454 may provide heat to one or more reaction vessels, a water distillation system, a heat-driven chilling apparatus (e.g., for operating condensers), a residential or industrial heating system, an agriculture system, an aquaculture system, or the like. As such, the thermal processing subsystem 458 may include one or more of turbines, reaction vessels, condensers, a water distillation system, a heat driven chilling apparatus, a residential heating system, an agriculture system, and an aquaculture system.

The fluid conduit 422 and optionally inlet conduit 466 may include attachment interfaces at their ends, which are configured for connecting to the wellhead 456. The wellhead 456 includes fluid connections, valves, and the like for facilitating appropriate operation of the geothermal system 450. For example, the wellhead 456 may include one or more valves to allow or restrict flow from the wellbore 452 towards the heat-driven process system 304. The wellhead 456 may include a relief valve for venting heat transfer fluid 454 if an excessive pressure is reached.

The heat transfer fluid 454 may be any appropriate fluid for absorbing heat within the wellbore 452 and driving a thermal process associated with the thermal processing subsystem 458. For example, the heat transfer fluid 454 may include water, a brine solution, one or more refrigerants, a thermal oil (e.g., a natural or synthetic oil), a silicon-based fluid, a molten salt, a molten metal, or a nanofluid (e.g., a carrier fluid containing nanoparticles). The heat transfer fluid 454 may be selected at least in part to limit the extent of corrosion of surfaces of the geothermal system 450. As an example, when the heat transfer fluid 454 is used to drive electricity-generating turbines (see FIG. 7), the heat transfer fluid 454 may be water. The water is supplied in the liquid phase and is transformed into steam within the wellbore 452. The steam can be used to drive turbines for electricity generation.

In some cases, such as to facilitate thermochemical processes or other manufacturing processes requiring higher temperatures than can be achieved using steam or other typical heat transfer fluids, a molten salt heat transfer fluid 454 may be used. A molten salt is a salt that is a liquid at the high operating temperatures experienced in the geothermal system 450 (e.g., at temperatures between 1,600 and 2,300° F.). In some cases, an ionic liquid may be used as the heat transfer fluid 454. An ionic liquid is a salt that remains a liquid at more modest temperatures (e.g., at or near room temperature). In some cases, a nanofluid may be used as the heat transfer fluid 454. The nanofluid may be a molten salt or ionic liquid with nanoparticles, such as graphene nanoparticles, dispersed in the fluid. Nanoparticles have at least one dimension of 100 nanometers (nm) or less. The nanoparticles increase the thermal conductivity of the molten salt or ionic liquid carrier fluid. This disclosure recognizes that molten salts, ionic liquids, and nanofluids can provide improved performance as heat transfer fluids in the geothermal system 450. For example, molten salts and/or ionic liquids may be stable at the high temperatures that can be reached in the underground chamber 440. The high temperatures that can be achieved by these materials not only facilitate increased energy extraction but also can drive thermal processes that were previously inaccessible using previous geothermal technology.

In an example operation of the geothermal system 450, a heat transfer fluid 454 is stored in fluid source 462. The fluid pump 464 pumps the heat transfer fluid 454 into the wellbore 452. The heat transfer fluid 454 travels down the borehole 402 and into the underground chamber 440. During this process, the heat transfer fluid 454 increases in temperature. The heat transfer fluid 454 may also vaporize and increase in pressure. In some cases, the heat transfer fluid 454 may become superheated.

The rate and/or pressure at which the heat transfer fluid 454 is supplied into the wellbore 452 can be adjusted to control the residence time of the heat transfer fluid 454 in the underground chamber 440. The rate at which the heat transfer fluid 454 is flowed into the wellbore 452 may also be adjusted to reach a target pressure/temperature in the underground chamber 440 (e.g., either to prevent or allow melting of surface 438), at the surface 216, and/or at the thermal processing subsystem 458. For example, the flow rate of a water heat transfer fluid 454 may be adjusted to generate steam at a target pressure for use in the thermal processing subsystem 458.

The heated heat transfer fluid 454 (whether still a liquid, a vapor/liquid mixture, a vapor, or a superheated liquid or vapor) then flows back toward the surface 216. For example, the heated heat transfer fluid 454 may flow through the center of the fluid conduit 422. The temperature of the heat transfer fluid 454 may decrease to some extent while flowing back towards the surface 216 (e.g., via heat transfer with the cooler heat transfer fluid 454 at a higher level in, or more recently introduced into, the wellbore 452). The insulation layer 424 may help mitigate against this decrease in temperature. Overall, the amount of temperature decrease experienced in the fluid conduit 422 can be accounted for, such that the heat transfer fluid 454 is heated to a temperature in excess of what is needed at the thermal processing subsystem 458. In this way, the heat transfer fluid 454 can still be at the desired conditions of temperature and/or pressure upon reaching the thermal processing subsystem 458. The wellhead 456 may include valves to further adjust the pressure and/or other characteristics of the wellbore 452.

After reaching the surface 216, the heated heat transfer fluid 454 is directed to the thermal processing subsystem 458. Details of an example thermal processing subsystem 458 are provided below with respect to FIG. 7. However, as a brief example, the thermal processing subsystem 458 may include one or more electricity-generating turbines. A vapor portion of the heated heat transfer fluid 454 is provided to the turbine(s) and used to generate electricity. The heat transfer fluid 454 is cooled and condensed during this process (or through subsequent processes), and the cooled, condensed heat transfer fluid 454 is returned to the fluid source 462 via return conduit 460. The heat transfer fluid 454 can then be returned to the underground chamber 440 to repeat the cycle described above.

At any given time during operation, a portion of the wellbore 452 may be filled with heat transfer fluid 454 as illustrated in the example of FIG. 4D. If problems occur associated with the flow of the heat transfer fluid 454 (e.g., because a molten salt heat transfer fluid 454 begins to cool too much at the surface 216), the heat transfer fluid 454 may be removed from the wellbore 452 to prevent damage to the geothermal system 450. Another fluid may be used to replace the heat transfer fluid 454 to maintain the structure of the underground chamber 440, for example, by maintaining a sufficiently high pressure and a sufficiently low temperature in the underground chamber 440. For example, if a molten salt heat transfer fluid 454 becomes too cool at any point along the closed cycle shown in FIG. 4D, there may be a risk of the molten salt solidifying, which may result in damage to components of the geothermal system 450 and corresponding downtimes during which operation of the system is not possible. To avoid such situations, the heat transfer fluid 454 may be removed from the wellbore 452 and replaced with another fluid (e.g., water) that will not solidify under the operating conditions. This may be done if the heat transfer fluid 454 reaches a temperature that is below a threshold temperature associated with the solidification temperature of the molten salt heat transfer fluid 454 being used. The replacement fluid is provided at a pressure to maintain the wellbore 452 at a sufficient pressure to maintain the cavity of the underground chamber 440. The replacement fluid may be flowed through the wellbore 452 (as shown by the arrows 455 in FIG. 4D) to maintain the underground chamber 440 at a temperature that limits melting of the surface 438 or limits the extent to which any magma 412 exposed through surface 438 mixes with the fluid.

Example Methods of Using and Preparing the Example Geothermal System

Figure 5:
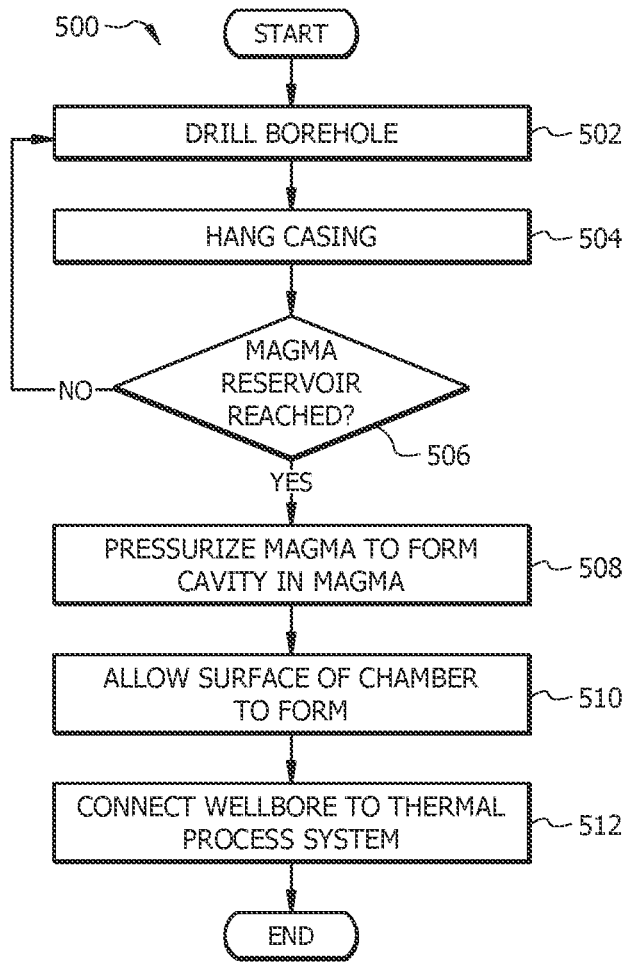
FIG. 5 is a flowchart of an example method for preparing the systems of FIGS. 4A-4D.

FIG. 5 illustrates an example method 500 of preparing the geothermal system 450 of FIG. 4D. The method 500 includes steps to achieve the various partially completed systems 400, 420, 430 shown in FIGS. 4A, 4B, and 4C, respectively, as well as the completed geothermal system 450 of FIG. 4D. The method 500 may begin at step 502 where a portion of the borehole 402 is drilled. For example, a predefined depth or distance 416 into the ground may be drilled using the drill bit 410. If a casing 404 is desired, the casing 404 is hung along the drilled portion of the borehole 402 at step 504. The casing 404 may be hung while or after advancing the drill bit 410. At step 506, a determination is made of whether magma 412 within the underground magma reservoir 214 has been reached. If the magma 412 has not been reached, operations return to step 502 to continue drilling the borehole 402 at step 502. If the magma 412 has been reached, the method 500 proceeds to step 508.

At step 508, the magma 412 is pressurized to form the underground chamber 440, as described with respect to FIGS. 4B and 4C above. In some embodiments, pressurizing the magma includes the additional step of placing a fluid conduit 422 into the magma 412. A pressurization fluid 442 may be supplied at a pressure 434 sufficient to displace the magma 412 to form the underground chamber 440. At step 510, while or after the underground chamber 440 is formed, a surface 438 is allowed to form around the underground chamber 440, as described above with respect to FIG. 4C.

At step 512, the wellbore, e.g., wellbore 452, is connected to the thermal process system 304. In some examples, fluid conduit 422 is connected to the wellhead 456 and thermal process system 304 at step 512, as shown in the example of FIG. 4D. Any appropriate fluid connections may be used to achieve these connections. The resulting geothermal system 450 can then be used to perform the steps of method 600 of FIG. 6, described below and any other operations described in this disclosure.

Modifications, omissions, or additions may be made to method 500 depicted in FIG. 5. Method 500 may include more, fewer, or other steps. For example, at least certain steps may be performed in parallel or in any suitable order. While at times discussed as well-reparation system 406 being used to perform steps, any suitable component(s) may perform or may be used to perform one or more steps of the method 500.

Figure 6:
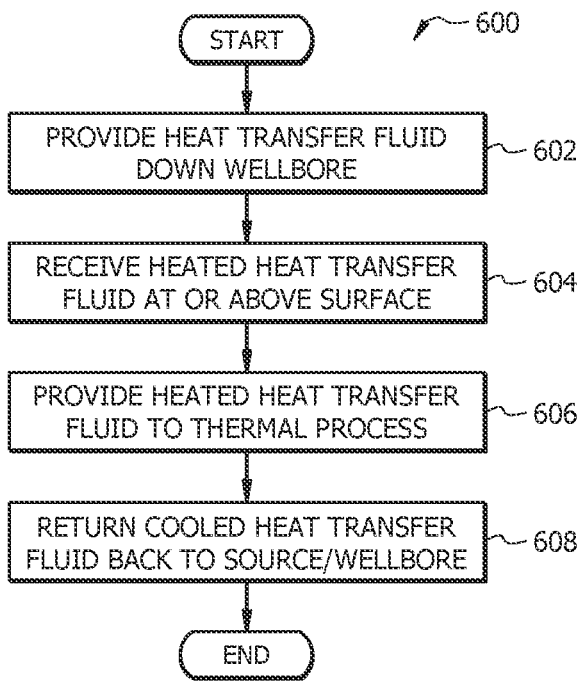
FIG. 6 is a flowchart of an example method for operating the system of FIG. 4D.

FIG. 6 illustrates an example method 600 of operating the geothermal system 450 of FIG. 4D. The method 600 may begin at step 602 where heat transfer fluid 454 is provided down the wellbore 452. For example, the fluid pump 464 may pump the heat transfer fluid 454 into the wellbore 452, such that the heat transfer fluid enters the underground chamber 440 formed in the magma reservoir 214, as described above with respect to FIG. 4D. At step 604, heat transfer fluid 454 that is heated in the underground chamber 440 is received at the surface 216. At step 606, the heated heat transfer fluid 454 is provided to the thermal processing subsystem 458. For example, at least a vapor portion of the heat transfer fluid 454 may be provided to turbine(s) that is/are operated to generate electricity. At step 608, at least a portion of the heat transfer fluid 454 from the thermal processing subsystem 458 is provided back down the wellbore 452 and into the underground chamber 440 (e.g., after the heat transfer fluid 454 is cooled and condensed).

Modifications, omissions, or additions may be made to method 600 depicted in FIG. 6. Method 600 may include more, fewer, or other steps. For example, at least certain steps may be performed in parallel or in any suitable order. While at times discussed as geothermal system 450 performing steps, any suitable component of the geothermal system 450 or other components of a geothermal system may perform or may be used to perform one or more steps of the method 600.

Example Thermal Processing Subsystem

FIG. 7 shows a schematic diagram of an example thermal processing subsystem 458 of FIG. 4D. The thermal processing subsystem 458 includes a condenser 702, a first turbine set 704, a second turbine set 708, a high-temperature/pressure thermochemical process 712, a medium-temperature/pressure thermochemical process 714, and one or more lower temperature/pressure processes 716a,b. The thermal processing subsystem 458 may include more or fewer components than are shown in the example of FIG. 7. For example, a thermal processing subsystem 458 used for power generation alone may omit the high-temperature/pressure thermochemical process 712, medium-temperature/pressure thermochemical process 714, and lower temperature/pressure processes 716a,b. Similarly, a thermal processing subsystem 458 that is not used for power generation may omit the turbine sets 704, 708. As a further example, if heat transfer fluid 454 is known to be received only in the gas phase, the condenser 702 may be omitted in some cases. The ability to tune the properties of the heat transfer fluid 454 received from the unique wellbore 452 of FIG. 4D facilitates improved and more flexible operation of the thermal processing subsystem 458. For example, the depth of the wellbore 452, the residence time of heat transfer fluid 454 in the underground chamber 440, the pressure achieved in the underground chamber 440, and the like can be selected or adjusted to provide desired heat transfer fluid properties at the thermal processing subsystem 458.

In the example of FIG. 7, the thermal processing subsystem 458 receives a stream 718 from the wellbore 452. One or more valves (not shown for conciseness) may be used to control the allocation of stream 718 within the thermal processing subsystem 458, e.g., to a condenser 702 via stream 720, and/or to the first turbine set 704 via stream 728, and/or to the thermal process 712 via stream 729. Thus, the entirety of stream 718 can be provided to any one of streams 720, 728, or 729, or distributed equally or unequally among streams 720, 728, and 729.

The condenser 702 is connected to the borehole 402 that extends between a surface and the underground magma reservoir. The condenser 702 separates a gas-phase heat transfer fluid 454 (e.g., steam) from liquid-phase heat transfer fluid 454 (e.g., condensate formed from the gas-phase heat transfer fluid 454). The condenser 702 may be a steam separator. A stream 720 received from the wellbore 452 may be provided to the condenser 702. A gas-phase stream 722 of heat transfer fluid 454 from the condenser may be sent to the first turbine set 704 and/or the thermal process 712 via stream 726. The thermal process 712 may be a thermochemical reaction requiring high temperatures and/or pressures (e.g., temperatures of between 500 and 2,000° F. and/or pressures of between 1,000 and 4,500 psig). A liquid-phase stream 724 of heat transfer fluid 454 from the condenser 702 may be provided back to the wellbore 452 (e.g., or to a fluid source 462—see FIG. 4D).

The first turbine set 704 includes one or more turbines 706a,b. In the example of FIG. 7, the first turbine set includes two turbines 706a,b. However, the first turbine set 704 can include any appropriate number of turbines for a given need. The turbines 706a,b may be any known or yet to be developed turbine for electricity generation. The turbine set 704 is connected to the condenser 702 and is configured to generate electricity from the gas-phase heat transfer fluid 454 (e.g., steam) received from the condenser 702 (stream 722). A condensate stream 730 exits the set of turbines 704. The condensate stream 730 may be provided back to the wellbore 452 (e.g., sent to the fluid source 462 of FIG. 4D).

If the heat transfer fluid 454 is at a sufficiently high temperature, as may be uniquely and more efficiently possible using the wellbore 452 with underground chamber 440, a stream 732 of gas-phase heat transfer fluid 454 may exit the first turbine set 704. Stream 732 may be provided to a second turbine set 708 to generate additional electricity. The turbines 710a,b of the second turbine set 708 may be the same as or similar to turbines 706a,b, described above.

All or a portion of stream 732 may be sent as gas-phase stream 734 to a thermal process 714. Process 714 is generally a process requiring gas-phase heat transfer fluid 454 at or near the conditions of the heat transfer fluid exiting the first turbine set 704. For example, the thermal process 714 may include one or more thermochemical processes requiring steam or another heat transfer fluid 454 at or near the temperature and pressure of stream 732 (e.g., temperatures of between 250 and 1,500° F. and/or pressures of between 500 and 2,000 psig). The second turbine set 708 may be referred to as "low pressure turbines" because they operate at a lower pressure than the first turbine set 704. Condensate from the second turbine set 708 is provided back to the wellbore 452 via stream 736.

An effluent stream 738 from the second turbine set 708 may be provided to one or more thermal process 716a,b. Thermal processes 716a,b generally require less thermal energy than processes 712 and 714, described above (e.g., processes 716a,b may be performed temperatures of between 220 and 700° F. and/or pressures of between 15 and 120 psig). As an example, processes 716a,b may include water distillation processes, heat-driven chilling processes, space heating processes, agriculture processes, aquaculture processes, and/or the like. For instance, an example heat-driven chiller process 716a may be implemented using one or more heat driven chillers. Heat driven chillers can be implemented, for example, in data centers, crypto-currency mining facilities, or other locations in which undesirable amounts of heat are generated. Heat driven chillers, also conventionally referred to as absorption cooling systems, use heat to create chilled water. Heat driven chillers can be designed as direct-fired, indirect-fired, and heat-recovery units. When the effluent includes low pressure steam, indirect-fired units may be preferred. An effluent stream 740 from all processes 712, 714, 716a,b, may be provided back to the wellbore 452.

At least one advantage of using the thermal processing subsystem 458 in combination with the improved geothermal system 450 of FIG. 4D is the ability to achieve an increased efficiency, which can be attributed, for example, to a simpler operational design with fewer parasitic loads such as from pumps and thermal losses (e.g., through the use of multiple heat exchange processes, rather than using the heat transfer fluid 454 that is heated in the wellbore 452 directly in each of the unit operations in the thermal processing subsystem 458). The superior heat source embodied by the example wellbore 452 with underground chamber 440 provides a higher ratio of usable energy to entropy than was possible using previous geothermal technology. Another example technical advantage of geothermal system 450 is the ability to implement multiple processes in series, such that remaining steam or other relatively high temperature/pressure heat transfer fluid 454 from one process can be used in another down-stream process. This may also decrease or eliminate energy expended to cool heat transfer fluid 454 before it is returned to the wellbore 452 at appropriate conditions.

ADDITIONAL EMBODIMENTS

The following descriptive embodiments are offered in further support of the one or more aspects of the disclosure:
Embodiment 1. A geothermal system, comprising:
a borehole extending between a surface and an underground chamber;
the underground chamber comprising a cavity formed in an underground reservoir of magma;
a fluid pump configured to provide a flow of heat transfer fluid into the underground chamber; and
a fluid conduit extending from the surface toward the underground chamber, the fluid conduit configured to allow flow of heat transfer fluid between the underground chamber and the surface.
Embodiment 2. The geothermal system of Embodiment 1, wherein at least a portion of an internal surface of the underground chamber comprises hardened magma.
Embodiment 3. The geothermal system of Embodiment 1, wherein at least a portion of an internal surface of the underground chamber comprises magma.
Embodiment 4. The geothermal system of Embodiment 3, wherein the heat transfer fluid is a molten salt.
Embodiment 5. The geothermal system of Embodiment 1, wherein a pressure provided to the underground chamber maintains the cavity within the underground reservoir of magma.
Embodiment 6. The geothermal system of Embodiment 1, wherein the cavity of the underground reservoir is formed by supplying a pressurized fluid into the underground reservoir of magma.
Embodiment 7. The geothermal system of Embodiment 1, further comprising a casing disposed within the borehole and extending from the surface and no farther than a ceiling of the underground reservoir of magma.
Embodiment 8. The geothermal system of Embodiment 1, wherein the heat transfer fluid comprises one or more of: water, a brine solution, one or more refrigerants, and one or more thermal oils.
Embodiment 9. The geothermal system of Embodiment 1, wherein the heat transfer fluid comprises one or more of a molten salt, an ionic liquid, and a nanofluid.
Embodiment 10. The geothermal system of Embodiment 1, wherein the fluid conduit is further coupled to a thermal process subsystem, wherein the thermal process subsystem comprises one or more of: turbines, reaction vessels, condensers, a water distillation system, a heat driven chilling apparatus, a residential heating system, an agriculture system, and an aquaculture system.
Embodiment 11. The geothermal system of Embodiment 10, wherein at least a portion of the heat transfer fluid conveyed to the thermal process subsystem by the fluid conduit is returned to the underground chamber.
Embodiment 12. The geothermal system of Embodiment 1, wherein the fluid conduit comprises an insulation layer.
Embodiment 13. The geothermal system of Embodiment 1, wherein the fluid pump is configured to provide the flow of the heat transfer fluid at a pressure, flow rate, or both that maintains the cavity formed in the underground reservoir of magma.
Embodiment 14. A method of operating a geothermal system, the method comprising:
providing a heat transfer fluid down a wellbore extending from a surface and into an underground chamber comprising a cavity formed in an underground reservoir of magma;
receiving heated heat transfer fluid from the wellbore; and
providing the heated heat transfer fluid to a thermal process.
Embodiment 15. The method of Embodiment 14, further comprising providing the heat transfer fluid to the wellbore at a pressure, flow rate, or both that maintains the cavity formed in the underground reservoir of magma.
Embodiment 16. The method of Embodiment 14, wherein:
the heat transfer fluid provided down the wellbore comprises liquid water and the heated heat transfer fluid received from the wellbore comprises steam; and
providing the heated heat transfer fluid to the thermal process comprises:
providing at least a portion of the steam to at least one turbine; and
operating the at least one turbine with the steam to generate electricity.
Embodiment 17. A geothermal system, comprising:
a fluid pump configured to provide a flow of heat transfer fluid through a wellbore from a surface and into an underground chamber comprising a cavity formed in an underground reservoir of magma; and
a fluid conduit extending from the surface toward the underground chamber, the fluid conduit configured to allow flow of heat transfer fluid heated in the underground chamber toward the surface.
Embodiment 18. The geothermal system of Embodiment 17, wherein the fluid pump is configured to provide the flow of the heat transfer fluid at a pressure, flow rate, or both that maintains the cavity formed in the underground reservoir of magma.
Embodiment 19. The geothermal system of Embodiment 17, wherein the fluid conduit comprises an insulation layer.
Embodiment 20. The geothermal system of Embodiment 17, wherein the heat transfer fluid comprises one or more of: water, a brine solution, one or more refrigerants, one or more thermal oils, a molten salt, an ionic liquid, and a nanofluid.
Embodiment 21. A method of forming a wellbore extending from a surface into an underground reservoir of magma, the method comprising:
drilling a borehole from the surface and exposing magma within the underground reservoir of magma;
providing a fluid conduit in the borehole that extends into the underground reservoir of magma;
injecting, through the fluid conduit, fluid into the underground reservoir of magma, thereby displacing the magma within the underground reservoir of magma and forming an underground chamber comprising a cavity within the underground reservoir of magma.

Embodiment 22. The method of Embodiment 21, further comprising allowing a surface to form around the cavity via heat transfer between the magma and the injected fluid, wherein the surface comprises hardened magma.

Embodiment 23. The method of Embodiment 21, further comprising continuing to provide a flow of the fluid into the underground chamber.

Embodiment 24. The method of Embodiment 21, further comprising separating a lower portion of the borehole from an upper portion of the borehole, thereby facilitating pressurization of the cavity in the underground reservoir of magma.

Embodiment 25. The method of Embodiment 24, further comprising:
injecting the fluid into the magma reservoir comprises injecting the fluid at a first pressure; and
applying a second pressure in the upper portion of the borehole, such that a pressure difference between the first pressure and the second pressure is less than a threshold value.

Embodiment 26. The method of Embodiment 24, wherein separating the lower portion of the borehole from the upper portion of the borehole comprises positioning a separation device in the borehole that extends from the fluid conduit in the borehole to a wall of the borehole.

Embodiment 27. The method of Embodiment 21, further comprising applying a casing to at least a portion of the borehole.

Embodiment 28. The method of Embodiment 37, wherein applying the casing comprises conveying a well casing into the borehole while or after advancing a drill bit used to drill the borehole towards the underground reservoir.

Embodiment 29. The method of Embodiment 21, wherein drilling the borehole comprises drilling into the surface to expose magma in underground reservoir of magma.

Embodiment 30. The method of Embodiment 21, wherein the injected fluid comprises a molten salt.

Embodiment 31. A system for preparing a geothermal wellbore for obtaining heated fluid from an underground reservoir of magma, the system comprising:
a drill bit coupled to a drill stem, the drill bit configured to drill a borehole extending from a surface to magma within the underground reservoir of magma;
a fluid conduit extending into the underground reservoir of magma;
a fluid pump configured to inject fluid through the fluid conduit into the underground reservoir of magma, thereby displacing magma within the underground reservoir of magma and forming an underground chamber comprising a cavity within the underground reservoir of magma.

Embodiment 32. The system of Embodiment 31, wherein the fluid pump is configured to inject the fluid at a temperature and a pressure at which a surface forms around the cavity via heat transfer between the magma and the injected fluid, wherein the surface comprises hardened magma.

Embodiment 33. The system of Embodiment 31, wherein the fluid pump is configured to continue to provide a flow of the fluid into the underground chamber.

Embodiment 34. The system of Embodiment 31, further comprising a separation device positioned in the borehole, the separation device configured to separate a lower portion of the borehole from an upper portion of the borehole, thereby facilitating pressurization of the cavity in the underground reservoir of magma.

Embodiment 35. The system of Embodiment 34, wherein the separation device is coupled to an outer surface of the fluid conduit and extends to a wall of the borehole.

Embodiment 36. The system of Embodiment 35, wherein the wall of the borehole is a surface of a casing disposed in at least a portion of the borehole.

Embodiment 37. The system of Embodiment 34, wherein the fluid pump is further configured to inject the fluid into the magma reservoir at a first pressure, while a second pressure is applied in the upper portion of the borehole, such that a pressure difference between the first pressure and the second pressure is less than a threshold value.

Embodiment 38. The system of Embodiment 31, further comprising a casing applied to at least a portion of the borehole.

Embodiment 39. The system of Embodiment 31, wherein the injected fluid comprises a molten salt.

Embodiment 40. A wellbore comprising:
a borehole extending between a surface and an underground chamber; and
the underground chamber comprising a cavity formed in an underground reservoir of magma.

Although embodiments of the disclosure have been described with reference to several elements, any element described in the embodiments described herein are exemplary and can be omitted, substituted, added, combined, or rearranged as applicable to form new embodiments. A skilled person, upon reading the present specification, would recognize that such additional embodiments are effectively disclosed herein. For example, where this disclosure describes characteristics, structure, size, shape, arrangement, or composition for an element or process for making or using an element or combination of elements, the characteristics, structure, size, shape, arrangement, or composition can also be incorporated into any other element or combination of elements, or process for making or using an element or combination of elements described herein to provide additional embodiments. Moreover, items shown or discussed as coupled or directly coupled or communicating with each other may be indirectly coupled or communicating through some interface device, or intermediate component whether electrically, mechanically, fluidically, or otherwise.

While this disclosure has been particularly shown and described with reference to preferred or example embodiments, it will be understood by those skilled in the art that various changes in form and detail may be made therein without departing from the spirit and scope of the disclosure. Accordingly, this disclosure includes all modifications and equivalents of the subject matter recited in the claims appended hereto as permitted by applicable law. Changes, substitutions and alterations are ascertainable by one skilled in the art and could be made without departing from the spirit and scope disclosed herein. Moreover, any combination of the above-described elements in all possible variations thereof is encompassed by the disclosure unless otherwise indicated herein or otherwise clearly contradicted by context.

Additionally, where an embodiment is described herein as comprising some element or group of elements, additional embodiments can consist essentially of or consist of the element or group of elements. Also, although the open-ended term "comprises" is generally used herein, additional embodiments can be formed by substituting the terms "consisting essentially of" or "consisting of."

What is claimed is:

1. A geothermal system, comprising:
in an initial configuration during formation of an underground chamber in an underground reservoir of magma;
a borehole extending between a surface and the underground reservoir of magma;
a fluid conduit extending from the surface and at least partially into the underground reservoir of magma; and
a fluid pump configured to provide a flow of a pressurized fluid into the underground reservoir of magma, thereby displacing magma from the underground reservoir of magma and forming an underground chamber comprising a cavity formed in the underground reservoir of magma, wherein at least a portion of an internal surface of the underground chamber comprises hardened magma; and
in a final configuration during heat transfer operations between the surface and the underground reservoir of magma;
the borehole extending between the surface and the underground chamber,
the fluid pump configured to provide a flow of heat transfer fluid into the underground chamber; and
the fluid conduit configured to allow flow of heat transfer fluid between the underground chamber and the surface.

2. The geothermal system of claim 1, wherein at least a portion of the internal surface of the underground chamber comprises magma.

3. The geothermal system of claim 2, wherein the heat transfer fluid is a molten salt.

4. The geothermal system of claim 1, wherein a pressure provided to the underground chamber in the final configuration maintains the cavity within the underground reservoir of magma.

5. The geothermal system of claim 1, further comprising, in the final configuration, a casing disposed within the borehole and extending from the surface and no farther than a ceiling of the underground reservoir of magma.

6. The geothermal system of claim 1, wherein the heat transfer fluid comprises one or more of: water, a brine solution, one or more refrigerants, and one or more thermal oils.

7. The geothermal system of claim 1, wherein the heat transfer fluid comprises one or more of a molten salt, an ionic liquid, and a nanofluid.

8. The geothermal system of claim 1, wherein the fluid conduit, in the final configuration, is further coupled to a thermal process subsystem, wherein the thermal process subsystem comprises one or more of turbines, reaction vessels, condensers, a water distillation system, a heat driven chilling apparatus, a residential heating system, an agriculture system, and an aquaculture system.

9. The geothermal system of claim 8, wherein at least a portion of the heat transfer fluid conveyed to the thermal process subsystem by the fluid conduit is returned to the underground chamber.

10. The geothermal system of claim 1, wherein the fluid conduit comprises an insulation layer.

11. The geothermal system of claim 1, wherein the fluid pump is configured to provide the flow of the heat transfer fluid at a pressure, flow rate, or both that maintains the cavity formed in the underground reservoir of magma.

12. A method of operating a geothermal system, the method comprising:
during formation of an underground chamber in an underground reservoir of magma:
forming a wellbore extending between a surface and an underground reservoir of magma; and
providing a flow of a pressurized fluid into the underground reservoir of magna, thereby displacing magma from the underground reservoir of magma and forming the underground chamber, the underground chamber comprising a cavity formed in the underground reservoir of magma, wherein at least a portion of an internal surface of the underground chamber comprises hardened magma; and
during, heat transfer operations between the surface and the underground reservoir of magma;
providing a heat transfer fluid down the wellbore and into the underground chamber;
receiving heated heat transfer fluid from the wellbore; and
providing the heated heat transfer fluid to a thermal process.

13. The method of claim 12, further comprising providing the heat transfer fluid to the wellbore at a pressure, flow rate, or both that maintains the cavity formed in the underground reservoir of magma.

14. The method of claim 12, wherein:
the heat transfer fluid provided down the wellbore comprises liquid water and the heated heat transfer fluid received from the wellbore comprises steam; and
providing the heated heat transfer fluid to the thermal process comprises:
providing at least a portion of the steam to at least one turbine; and
operating the at least one turbine with the steam to generate electricity.

15. A geothermal system, comprising:
in an initial configuration during formation of an underground chamber in an underground reservoir of magma,
a fluid pump configured to provide a flow of a pressurized fluid through a wellbore and into the underground reservoir of magma, thereby displacing magma from the underground reservoir of magma and forming the underground chamber, the underground chamber comprising a cavity formed in the underground reservoir of magma, wherein at least a portion of an internal surface of the underground chamber comprises hardened magma; and
in a final configuration during heat transfer operations between a surface and the underground reservoir of magma:
the fluid pump configured to provide a flow of heat transfer fluid through the wellbore and into the underground chamber; and
a fluid conduit extending from the surface toward the underground chamber, the fluid conduit configured to allow flow of heat transfer fluid heated in the underground chamber toward the surface.

16. The geothermal system of claim 15, wherein the fluid pump is configured to provide the flow of the heat transfer fluid at a pressure, flow rate, or both that maintains the cavity formed in the underground reservoir of magma.

17. The geothermal system of claim 15, wherein the fluid conduit comprises an insulation layer.

18. The geothermal system of claim 15, wherein the heat transfer fluid comprises one or more of: water, a brine solution, one or more refrigerants, one or more thermal oils, a molten salt, an ionic liquid, and a nanofluid.

* * * * *